United States Patent [19]

Males et al.

[11] Patent Number: 4,787,498

[45] Date of Patent: Nov. 29, 1988

[54] TIRE HANDLING TRAY SORTATION SYSTEM

[75] Inventors: Maurice C. Males, Alpharetta; Suren Varjabedian, Dunwoody, both of Ga.

[73] Assignee: Babcock Industries Inc., Fairfield, Conn.

[21] Appl. No.: 154,389

[22] Filed: Feb. 10, 1988

[51] Int. Cl.[4] .............................................. B65G 47/46
[52] U.S. Cl. ..................................... 198/365; 198/802
[58] Field of Search ................... 198/802, 482.1, 483.1, 198/365

[56] References Cited

U.S. PATENT DOCUMENTS

| | | | |
|---|---|---|---|
| 3,669,245 | 6/1972 | Wooten et al. | 198/365 |
| 4,378,062 | 3/1982 | Macrum | 198/365 |
| 4,635,785 | 1/1987 | Pryotz | 198/365 |
| 4,722,430 | 2/1988 | Canziani | 198/365 |

Primary Examiner—Robert J. Spar
Assistant Examiner—D. Glenn Dayoan
Attorney, Agent, or Firm—Barnes, Kiselle, Raisch, Choate, Whittemore & Hulbert

[57] ABSTRACT

A tray sortation system particularly suited to the handling of tires which are at elevated temperature and tend to adhere to the tray which comprises a plurality of interconnected carriage assemblies movable along a track, each carriage assembly including a tray which is tilted on an axis generally parallel to the axis of travel. Each tray is provided with a fixed roller mounted along the center line of the tray and extending in the direction of movement of the tray. Each carriage assembly further includes a pair of rollers attached thereto and adapted to extend through openings in the tray when the tray is tilted thereby breaking any contact formed between the tire and the tray and insuring a free gravitational discharge of the tire from the tray at an assigned discharge location.

6 Claims, 2 Drawing Sheets

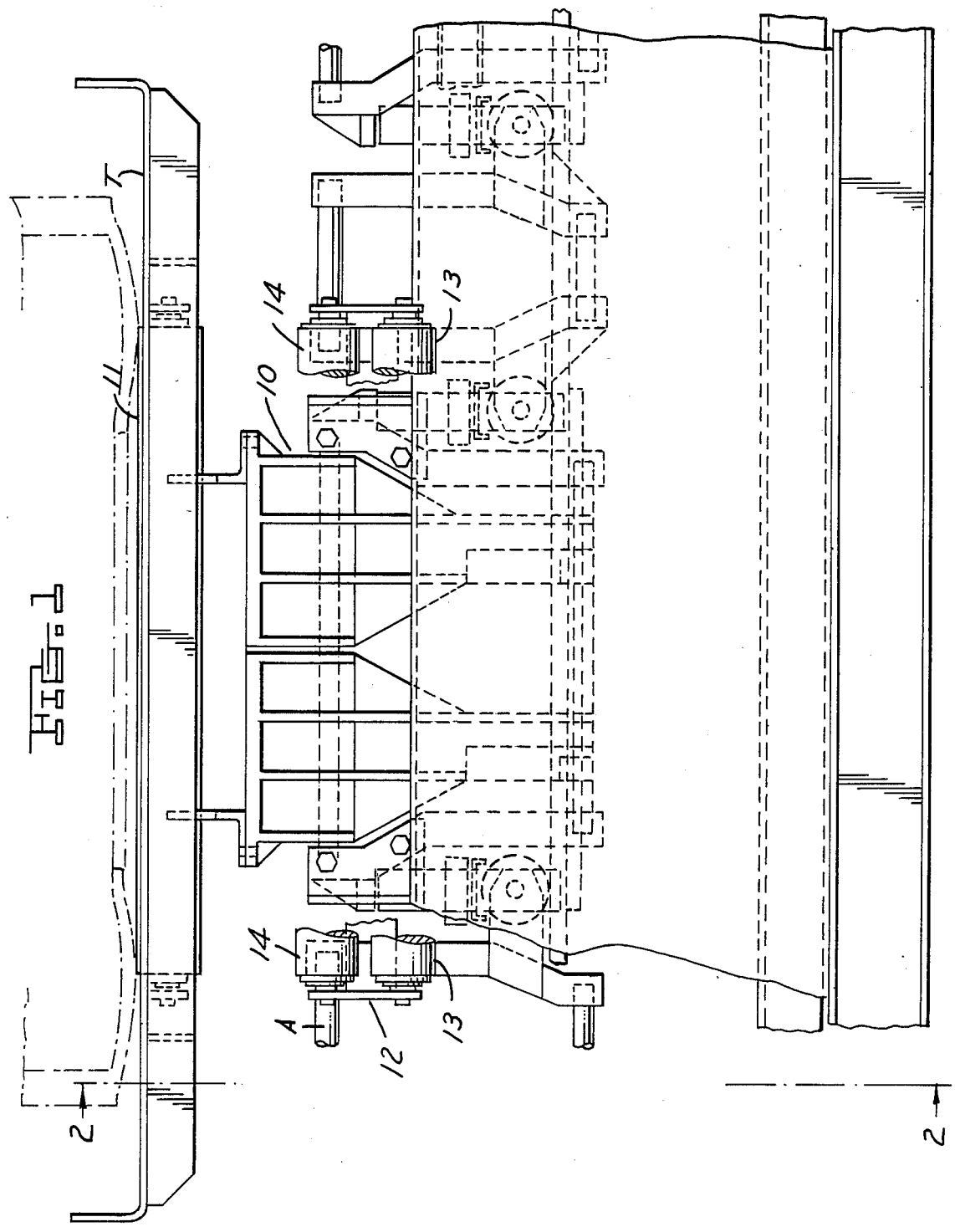

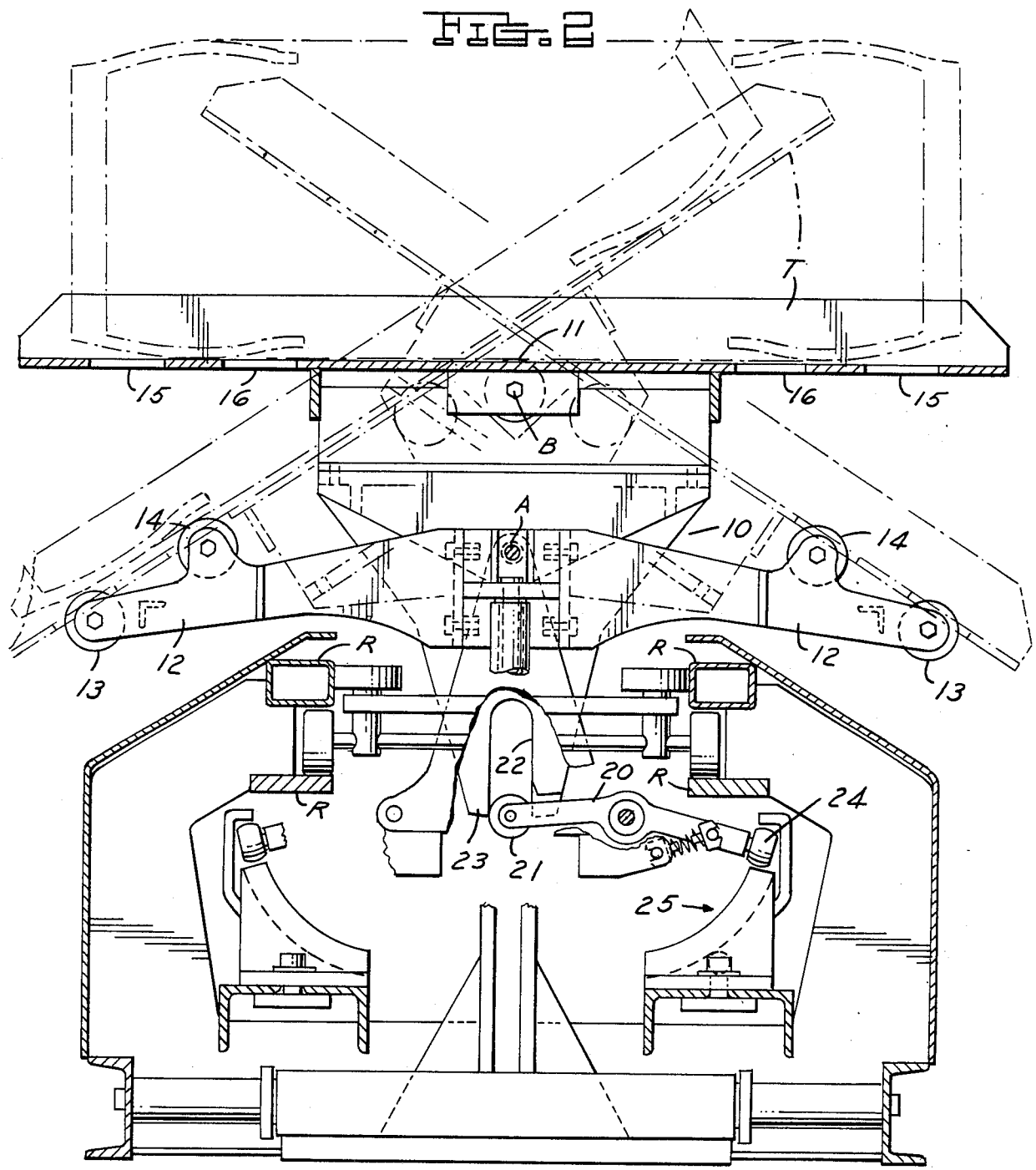

TIRE HANDLING TRAY SORTATION SYSTEM

This invention relates to tray sortation systems and particularly to tray sortation systems for handling passenger car and light truck tires as received from the presses for sortation to various production operations.

BACKGROUND AND SUMMARY OF THE INVENTION

In the handling of passenger car and light truck tires received from the presses it is common to use a tray sortation system for delivery of the tires to selected destinations. However, the heat of the product, which may be on the order 110° to 150° F., tends to cause adherence of the tire to the conventional sheet metal tray.

Among the objectives of the present invention are to provide a tray sortation system for such hot products which will break any contact formed between the hot product and the tray and assist the gravitational discharge of the product from the tray at an assigned discharge location; which requires a minimum number of parts; which is easy to maintain; and which is relatively low in cost.

In accordance with the invention a tray sortation system is provided which is particularly suited to the handling of tires which are at elevated temperature and tend to adhere to the tray which comprises a plurality of carriage assemblies movable along a track, each carriage assembly including a tray which is tilted on an axis generally parallel to the axis of travel. Each tray is provided with a fixed roller mounted along the center line of the tray and extending in the direction of movement of the tray. Each carriage assembly further includes a pair of rollers attached thereto and adapted to extend through openings in the tray when the tray is tilted thereby breaking any contact formed between the tire and the tray and insuring free gravitational discharge of the tire from the tray at an assigned discharge location.

DESCRIPTION OF THE DRAWINGS

FIG. 1 is a fragmentary side view of a portion of a tire handling tray sortation system embodying the invention.

FIG. 2 is a sectional view taken along the line 2—2 in FIG. 1, parts being broken away.

DESCRIPTION

Referring to FIGS. 1 and 2, the tray sortation system embodying the invention is of generally conventional construction and includes a track formed by spaced rails R along which a plurality of pivotally interconnected wheeled carriage assemblies 10 are moved by a drive mechanism. Each carriage assembly 10 supports a tray T which is mounted for movement about an axis A extending in the direction of movement and is adapted to be latched in horizontal position and unlatched for tilting movement to one side or the other in order to discharge the product thereon.

In accordance with the invention, the tray T is provided with a roller 11 that is fixed on the tray T along the center line of the tray with the axis B extending in the direction of movement of the tray T. Each carriage 10 is provided with laterally extending arms 12 fixed thereto and supporting a pair of rollers 13, 14 having their axes parallel to the direction of movement of the carriage and defining a plane which is at an acute angle to the horizontal. Each tray T is provided with spaced elongated openings 15, 16.

More specifically, arms 12 are longitudinal spaced from one another and rollers 13, 14 are rotatably mounted between the arms 12.

Latching and unlatching mechanism are well known. Referring to FIG. 2, the latching and latching mechanism comprises a pair of levers 20, one on each side of carriage assembly 10. Each lever is pivoted intermediate its ends about an axis parallel to the axis A. Each lever 20 has an inner end with a roller 21 engaging a slot 22 on a bracket 23 fixed to tray T. Each lever 20 has an outer end with a roller 24 adapted to engage a track or latch 25 along the path of the trays for holding or tilting the trays. An over-center spring loaded member is pivoted to the carriage assembly 10 and the lever 20 to tend to hold the tray in horizontal position or tilted position.

When a tray T bearing a hot tire is moved along and is intended to be discharged along one side or the other, the tray T is unlatched in the desired direction and as the tray T tilts, the adjacent rollers 13, 14 project through the openings 15, 16 lifting the tire out of engagement with the tray T and breaking the adhesion, if any, between the tray T and the tire. This combined with the single center roller 11 insures that the friction between the tire and tray is reduced sufficiently to insure free gravitational discharge of the tire of the desired assigned discharge location.

It has been found that the system will handle tires of various sizes and diameters. The number of rollers 12, 13 will depend on the range of sizes being handled, larger diameters requiring more rollers. Roller length is determined by the largest contact diameter of the tire relative to the tray and should include an allowance for off-center loading in the longitudinal direction. The center roller 11 is required when the adhesiveness of the tires is such that the tire tends to adhere to the tray with excessive force.

It can thus be seen that there has been provided a tray sortation system for hot products such as tires which will break any contact formed between the hot product and the tray and insure a free gravitational discharge of the product from the tray at an assigned discharge location; which is positive; which require a minimum number of parts; which is easy to maintain; and which is relatively low in cost.

We claim:

1. A tray sortation system particularly suited to the handling of tires which are at elevated temperature and tend to adhere to the tray which comprises a plurality of carriage assemblies movable along a track and defining an axis of travel, each carriage assembly including a tray which is tiltable about an axis generally parallel to the axis of travel by a tilting means, each said tray having a first set of openings, each carriage assembly further including a first pair of rollers attached thereto along one side of the carriage assembly and adapted to extend through said first set of openings in the tray when the tray is tilted by said tilting means toward said first pair of rollers thereby breaking any contact formed between the tire and the tray and insuring a free gravitational discharge of the tire from the tray at a predetermined discharge location along said track.

2. The system set forth in claim 1 including a second pair of rollers on said carriage assembly along the other side of the carriage, said tray having a second set of openings therein through which the second set of rollers will extend when the tray is tilted by said tilting means toward the second set of rollers.

3. A tray sortation system particularly suited to the handling of tires which are at elevated temperature and tend to adhere to the tray which comprises a plurality of carriage assemblies movable along a track and defining an axis of travel, each carriage assembly including a tray which is tiltable about an axis generally parallel to the axis of travel by a tilting means, each said tray having a pair of openings, a fixed roller mounted along the center line of each tray and extending in the direction of movement of the tray, each carriage assembly further including a pair of rollers attached thereto along one side of the carriage assebly and adapted to extend through said pair of openings in the tray when the tray is tilted toward said pair of rollers thereby breaking any contact formed between the tire and the tray and insuring a free gravitational discharge of the tire from the tray at a predetermined discharge location along said track.

4. A tray sortation system particularly suited to the handling of tires which are at elevated temperature and tend to adhere to the tray comprising a carriage assembly adapted to be moved along a track and defining an axis of travel, said carriage assembly including a tray being tiltable about an axis generally parallel to the axis of travel by a tilting means, each said tray having a first set of openings, each carriage assembly further including a first pair of rollers attached thereto along one side of the carriage assembly and adapted to extend through said first set of openings in the tray when the tray is tilted by said tilting means toward said first pair of rollers thereby breaking any contact formed between the tire and the tray and insuring a free gravitational discharge of the tire from the tray at a predetermined discharge location along said track.

5. The system set forth in claim 4 including a second pair of rollers on said carriage assembly along the other side of the carriage, said tray having a second set of openings therein through which the second set of rollers will extend when the tray is tilted by said tilting means toward the second set of rollers.

6. A tray sortation system particularly suited to the handling of tires which are at elevated temperature and tend to adhere to the tray which comprises a plurality of carriage assemblies movable along a track and defining an axis of travel, each carriage assembly including a tray which is tiltable about an axis generally parallel to the axis of travel by a tilting means, each said tray including a pair of openings, each carriage assembly further including a pair of rollers attached thereto along one side of the carriage assembly and adapted to extend through said pair of openings in the tray when the tray is tilted by said tilting means toward said pair of rollers thereby breaking any contact formed between the tire and the tray and insuring a free gravitational discharge of the tire from the tray at a predetermined discharge location along said track.

* * * * *